(No Model.)
A. F. WENDT.
APPARATUS FOR RECOVERING VOLATILIZED METALS.
No. 311,699. Patented Feb. 3, 1885.
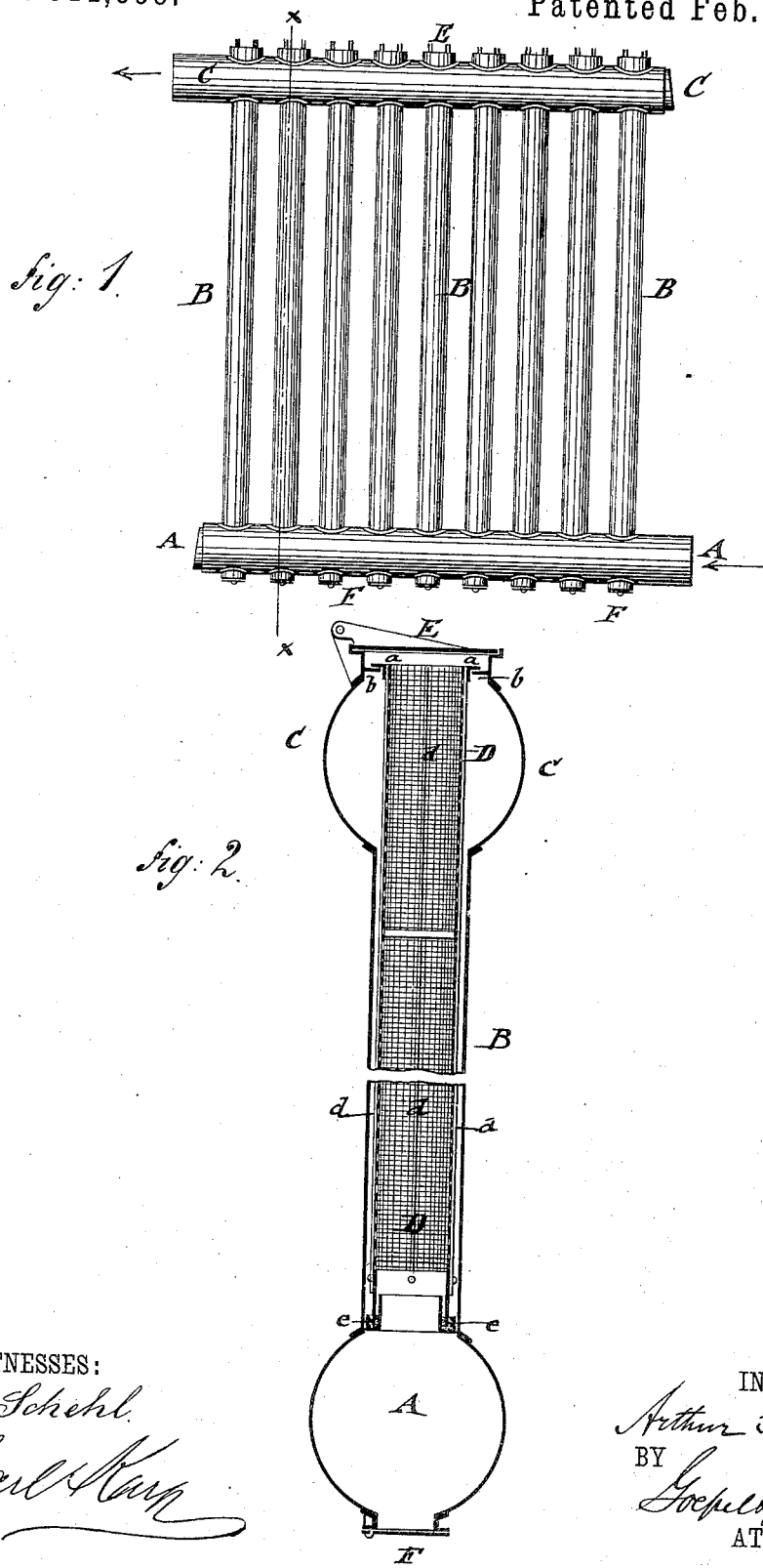

UNITED STATES PATENT OFFICE.

ARTHUR F. WENDT, OF NEW YORK, N. Y.

APPARATUS FOR RECOVERING VOLATILIZED METALS.

SPECIFICATION forming part of Letters Patent No. 311,699, dated February 3, 1885.

Application filed August 14, 1884. (No model.)

*To all whom it may concern:*

Be it known that I, ARTHUR F. WENDT, of the city, county, and State of New York, have invented certain new and useful Improvements in Apparatus for Recovering Volatilized Metals from Furnace-Gases, of which the following is a specification.

In the smelting of ores containing volatile metals a considerable portion of these metals is volatilized and carried off by escaping gases in the metallic form, provided these gases are mixed with air. Often the more volatile metals carry with them appreciable quantities of other less volatile metals. Various methods have been proposed to recover this waste. The most successful system, and the one heretofore in general use, is to pass the gases mixed with air through a series of chambers, flues, or pipes, on the surface of which the oxidized volatilized substances are in part precipitated, and thus in a large measure recovered. Sometimes showers of water are used to aid in the collection of what is technically known as "flue-dust." Sheets of metal hung in the flues to increase the arresting-surfaces are also said to be beneficial.

In the common practice of lead-smelting the escaping gases are not utilized in any manner except as indicated.

In smelting zinciferous ores of iron or furnace products—such as the "residuum" used in the manufacture of spiegeleisen from franklinite residues—the waste or tunnel-head gas is not allowed to be mixed with air, and is passed through a series of sheet-iron pipes. Much of the zinc is condensed on these pipes and collected as a mixture of oxide and blue powder, mainly the former. The gas thus partially freed from zinc is in part burned under the boilers which generate the power required to operate the blast-furnace, and the remainder of the gas is burned in hot-blast stoves used to heat the blast.

I have discovered by experiments that the zinc in these gases is practically entirely in a metallic form. On burning these gases the zinc is converted into oxide and escapes up the chimneys. It coats injuriously any object with which the burning gases are brought in contact, and the heat is thereby prevented from being properly utilized, and expensive cleaning and repair become necessary.

The object of this invention is to recover the volatilized metals from the smoke or waste gases of blast or other furnaces in metallic state, and to completely free said furnace-gases from the metals with a view to the more perfect utilization of these gases; and the invention consists of the process of passing the furnace-gases unmixed with air through wire screens, on which the volatile metals condense, and from which the condensed metallic powder is removed from time to time.

The invention consists, secondly, of an apparatus for recovering the volatilized metals from the furnace-gases, which is composed of vertical stand-pipes having interior cylindrical wire screens, an inlet-pipe, and an outlet-pipe, said inlet-pipe having cleaning-doors vertically below the stand-pipes.

In the accompanying drawings, Figure 1 represents a side elevation of my improved apparatus for recovering volatilized metals from blast-furnace gases. Fig. 2 is a vertical transverse section of the same on line $x\,x$, Fig. 1, drawn on a larger scale.

Similar letters of reference indicate corresponding parts.

A in the drawings represents a horizontal inlet-pipe for the gases from the furnace, and B a series of vertical stand-pipes that connect the inlet-pipe A with an outlet-pipe, C, at the top of the pipes B, and D are interior cylindrical wire screens which are suspended from the pipe C, and have their lower edge immersed in an annular trough, $e$, filled with sand. The cylindrical screens D extend through the outlet-pipe C, as shown in Fig. 2. The upper ends of the screens D rest by flanged rims $a$ on a circular seat, $b$, on the upper part of the outlet-pipe C. At the top, and vertically above the upper end of each screen D, is arranged a hinged lid or door, E, that is lifted whenever an explosion in the stand-pipe takes place, so as to permit the escape of the gases of combustion. The cylindrical screens are stiffened by vertical rods $d\,d$, as shown in Fig. 2. At the lower part of the inlet-pipe A are arranged in line with the wire screens D pivoted closing doors or lids F, which are opened laterally when it is desired to remove the powder deposited on the screens. The wire screens can be made of wire-cloth having as coarse a mesh as twenty to the inch.

The total surface of the wire screens has to be sufficient to permit the slow passage of the gases through the same. When the apparatus is in practical operation, the gases—for instance, from a blast-furnace treating residuum—are passed through the apparatus, whereby the inner surface of the wire screens becomes rapidly coated with finely-divided metallic zinc or blue powder, which in the course of an hour or two fills the holes of the screens and presents a smooth, uniform, bluish-gray surface. The gases containing the volatilized metal continue to pass through the blue powder collected on the screen, which powder becomes, in connection with the screen, a perfect condenser for arresting all the particles of zinc in a metallic state. The gases that have passed through the wire screen are clean and burn with a clear blue flame and without appreciable smoke. The blue powder collected on the screens is readily removed by sharply tapping the screens, and then opening the cleaning-doors of the inlet-pipe A. As the gases have to be forced or drawn through the screen after it has been covered with a thin layer of blue powder, a suitable blower or other gas-forcing apparatus or a steam-jet is preferably used with advantage.

I am aware that oxide of zinc has heretofore been recovered from furnace-gases by means of screens and filtering materials. Such filters have, however, acted entirely mechanically, depending on the fact that the holes in the filtering material are smaller than the particles to be filtered.

I am also aware that furnace-gases have been passed through sheet-iron conduits with a view of condensing zinc oxide on these surfaces. By my improved method the zinc in the gases is condensed and deposited in a metallic state, and not filtered out as an oxide.

It is the fact that finely-divided metallic zinc (blue powder) is oxidized at a certain temperature by carbonic acid, which is decomposed, so as to form carbonic oxide and zinc oxide. In passing a mixture of carbonic acid and oxide gases laden with zinc vapors through a comparatively coarse wire screen the temperature is suddenly reduced, and the zinc, having no time to oxidize, is arrested and condensed in a metallic state.

Having thus described my invention, I claim as new and desire to secure by Letters Patent—

1. An apparatus for recovering volatilized metals, consisting of an air-tight exterior casing, an interior condensing wire screen or wire screens, an inlet-pipe communicating with the screen or screens, and an outlet-pipe communicating with the casing, substantially as set forth.

2. An apparatus for recovering volatilized metals from furnace-gases, which consists of a series of vertical stand-pipes, interior cylindrical wire screens, an inlet-pipe, and an outlet-pipe, communicating, respectively, with the stand-pipes, substantially as set forth.

3. An apparatus for recovering volatilized metals from furnace-gases, consisting of a series of vertical stand-pipes, cylindrical wire screens at the interior of said stand-pipes, an inlet-pipe communicating with the bottom ends of said stand-pipes and having cleaning-doors vertically below the same, and an outlet-pipe connecting the top ends of the stand-pipes, substantially as set forth.

4. An apparatus for recovering volatilized metals from furnace-gases, consisting of a series of vertical stand-pipes having interior cylindrical wire screens, an inlet-pipe communicating with the lower ends of said stand-pipes, and having pivoted cleaning-doors vertically in line with said stand-pipes, and an outlet-pipe communicating with the top of the stand-pipes, and provided with hinged explosion-doors vertically above the screens, substantially as set forth.

In testimony that I claim the foregoing as my invention I have signed my name in presence of two subscribing witnesses.

ARTHUR F. WENDT.

Witnesses:
PAUL GOEPEL,
SIDNEY MANN.